United States Patent
Zhao et al.

(10) Patent No.: US 10,469,996 B2
(45) Date of Patent: Nov. 5, 2019

(54) GROUP SCAN IN OVERLAPPING GEOFENCES

(71) Applicant: MOTOROLA SOLUTIONS, INC., Chicago, IL (US)

(72) Inventors: Dong Zhao, Chengdu (CN); Jian-Feng Wang, Chengdu (CN); Jing Wang, Chengdu (CN)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days.

(21) Appl. No.: 16/079,121

(22) PCT Filed: Apr. 28, 2016

(86) PCT No.: PCT/CN2016/080580
§ 371 (c)(1),
(2) Date: Aug. 23, 2018

(87) PCT Pub. No.: WO2017/185313
PCT Pub. Date: Nov. 2, 2017

(65) Prior Publication Data
US 2019/0069337 A1    Feb. 28, 2019

(51) Int. Cl.
*H04W 4/029* (2018.01)
*H04W 76/45* (2018.01)
(Continued)

(52) U.S. Cl.
CPC ........... *H04W 4/029* (2018.02); *H04W 4/021* (2013.01); *H04W 4/08* (2013.01); *H04W 4/10* (2013.01); *H04W 76/45* (2018.02); *H04W 84/08* (2013.01)

(58) Field of Classification Search
CPC .................................................... H04W 4/029
See application file for complete search history.

(56) References Cited

U.S. PATENT DOCUMENTS

| 5,758,291 A * | 5/1998 | Grube | H04W 84/08 |
| | | | 455/518 |
| 2013/0324166 A1* | 12/2013 | Mian | H04W 4/021 |
| | | | 455/457 |

(Continued)

FOREIGN PATENT DOCUMENTS

CN        104994471        10/2015

OTHER PUBLICATIONS

The International Search Report and the Written Opinion, corresponding patent application No. PCT/CN2016/080580, filed Apr. 28, 2016, dated Feb. 3, 2017, all pages.

*Primary Examiner* — Ankur Jain

(57) ABSTRACT

The present invention relates to method, system and electronic communications device for providing group scan for mobile devices located in overlapping active geofences. A method comprises, at one of a mobile device and a radio controller device in an infrastructure associated with the mobile device: determining a current location of the mobile device; identifying a plurality of active geofences having definitions that include the determined current location of the mobile device; accessing a geofence mapping that assigns, for each of the identified plurality of active geofences, one of a plurality of different priority levels and one of a plurality of different talkgroups; monitoring each of the plurality of different talkgroups for active calls as a function of the different priority levels; identifying a subset of the plurality of different talkgroups from the plurality of different talkgroups in the geofence mapping having an active call and, for each talkgroup in the subset, a particular talkgroup associated with a highest priority geofence; and joining the mobile device to the particular talkgroup.

20 Claims, 6 Drawing Sheets

(51) Int. Cl.
*H04W 4/021* (2018.01)
*H04W 4/08* (2009.01)
*H04W 4/10* (2009.01)
*H04W 84/08* (2009.01)

(56) References Cited

U.S. PATENT DOCUMENTS

| | | | |
|---|---|---|---|
| 2014/0162692 A1* | 6/2014 | Li | H04L 67/40 455/456.3 |
| 2014/0164118 A1* | 6/2014 | Polachi | G06Q 30/0259 705/14.57 |
| 2016/0295363 A1* | 10/2016 | Jelle | H04W 4/021 |

* cited by examiner

GROUP SCAN IN OVERLAPPING GEOFENCES

This application is a National Stage filing under 35 USC § 371 of co-pending Patent Cooperation Treaty international application having Serial No. PCT/CN2016/080580 (the 'PCT international application') filed on Apr. 28, 2016. This application claims priority to the PCT international application, the entire contents of which are incorporated herein by reference.

BACKGROUND OF THE INVENTION

A radio access network (RAN) provides for radio communication links to be arranged within the network between a plurality of user terminals. Such user terminals may be mobile and may be known as 'mobile stations' or 'mobile devices.' At least one other terminal, e.g. used in conjunction with mobile devices, may be a fixed terminal, e.g. a base station, eNodeB, repeater, and/or access point. Such a RAN typically includes a system infrastructure that generally includes a network of various fixed terminals, which are in direct radio communication with the mobile devices. Each of the fixed terminals operating in the RAN may have one or more transceivers which may, for example, serve mobile devices in a given region or area, known as a 'cell' or 'site', by radio frequency (RF) communication. The mobile devices that are in direct communication with a particular fixed terminal are said to be served by the fixed terminal. In one example, all radio communications to and from each mobile device within the RAN are made via respective serving fixed terminals. Sites of neighboring fixed terminals may be offset from one another and may provide corresponding non-overlapping or partially or fully overlapping RF coverage areas.

RANs may operate according to an industry standard protocol such as, for example, an open media alliance (OMA) push to talk (PTT) over cellular (OMA-PoC) standard, a voice over IP (VoIP) standard, or a PTT over IP (PoIP) standard. Typically, protocols such as PoC, VoIP, and PoIP are implemented over broadband RANs including third generation and fourth generation networks such as third generation partnership project (3GPP) Long Term Evolution (LTE) networks.

RANs may additionally or alternatively operate according to an industry standard land mobile radio (LMR) protocol such as, for example, the Project 25 (P25) standard defined by the Association of Public Safety Communications Officials International (APCO), the TETRA standard defined by the European Telecommunication Standards Institute (ETSI), the Digital Private Mobile Radio (dPMR) standard also defined by the ETSI, or the Digital Mobile Radio (DMR) standard also defined by the ETSI. Because these systems generally provide lower throughput than the broadband systems, they are sometimes designated narrowband RANs.

Communications in accordance with any one or more of these protocols or standards, or other protocols or standards, may take place over physical channels in accordance with one or more of a TDMA (time division multiple access), FDMA (frequency divisional multiple access), OFDMA (orthogonal frequency division multiplexing access), or CDMA (code division multiple access) protocol. Mobile devices in RANs such as those set forth above send and receive data (such as encoded voice, audio, and/or audio/video streams) in accordance with the designated protocol.

OMA-PoC, in particular, enables familiar PTT and "instant on" features of traditional half duplex mobile devices, but uses mobile devices operating over modern broadband telecommunications networks. Using PoC, wireless mobile devices such as mobile telephones and notebook computers can function as PTT half-duplex mobile devices for transmitting and receiving. Other types of PTT models and multimedia call models (MMCMs) are also available.

Floor control in an OMA-PoC session is generally maintained by a PTT server that controls communications between two or more wireless mobile devices. When a user of one of the mobile devices keys a PTT button, a request for permission to speak in the OMA-PoC session is transmitted from the user's mobile device to the PTT server using, for example, a real-time transport protocol (RTP) message. If no other users are currently speaking in the PoC session, an acceptance message is transmitted back to the user's mobile device and the user can then speak into a microphone of the device. Using standard compression/decompression (codec) techniques, the user's voice is digitized and transmitted using discrete auditory data packets (e.g., together which form an auditory data stream over time), such as according to RTP and internet protocols (IP), to the PTT server. The PTI server then transmits the auditory data packets to other users of the PoC session (e.g., to other mobile devices in the group of mobile devices or talkgroup to which the user is subscribed), using for example, one or more of a unicast, point to multipoint, or broadcast communication technique.

Narrowband LMR systems, on the other hand, operate in either a conventional or trunked configuration. In either configuration, a plurality of mobile devices is partitioned into separate groups of mobile devices. In a conventional system, each mobile device in a group is selected to a particular radio channel (frequency or frequency & time slot) for communications associated with that mobile device's group. Thus, each group is served by one channel, and multiple groups may share the same single frequency (in which case, in some embodiments, group IDs may be present in the group data to distinguish between groups using the same shared frequency).

In contrast, a trunked radio system and its mobile devices use a pool of traffic channels for virtually an unlimited number of groups of mobile devices (e.g., talkgroups). Thus, all groups are served by all channels. The trunked radio system works to take advantage of the probability that not all groups need a traffic channel for communication at the same time. When a member of a group requests a call on a control or rest channel on which all of the mobile devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the mobile devices were idling to a traffic channel for the call, and instruct all mobile devices that are not participating in the new call to move to a newly assigned control or rest channel selected from the pool of available channels. With a given number of channels, a much greater number of groups can be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., mobile devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, mobile devices may dynamically affiliate with a group (and also disassociate with the group) perhaps based on user input, and the switching and/or radio network may track group membership and route new group calls according to the current group membership.

Many so-called "public safety" or other private or government wireless communication systems provide for group-based radio communications amongst a plurality of mobile devices. In certain situations, important group calls may be associated with a particular area in which a responding officer or other type of user is located. Particular areas and their associated talkgroup may, in some instances, be defined by geofences, which help to establish virtual barriers based on a geographical coordinate system. For example, at an incident scene, a geofence and associated talkgroup may be established in an area associated with the incident scene, and a responding officer or other user may manually or automatically switch their radio to the associated talkgroup when arriving at the incident scene and crossing into the geofence. In an enterprise environment, a geofence and associated talkgroup may be established for retail and warehouse personnel, and an employee arriving at work may manually or automatically switch their radio to the associated talkgroup when arriving at work and crossing into the geofence.

However, as more geofences get created and associated with separate talkgroups, it becomes difficult for a user and mobile device located within multiple geofences at a same time and/or roaming into and out of several geofence regions which may partially or fully overlap, to keep track of which talkgroup(s) it should be or is already joined to and when to join a call occurring on one of those talkgroups.

Accordingly, what is needed is an improved method and apparatus for providing an intelligent and dynamic group scan capability across multiple overlapping geofence regions and their associated talkgroups.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
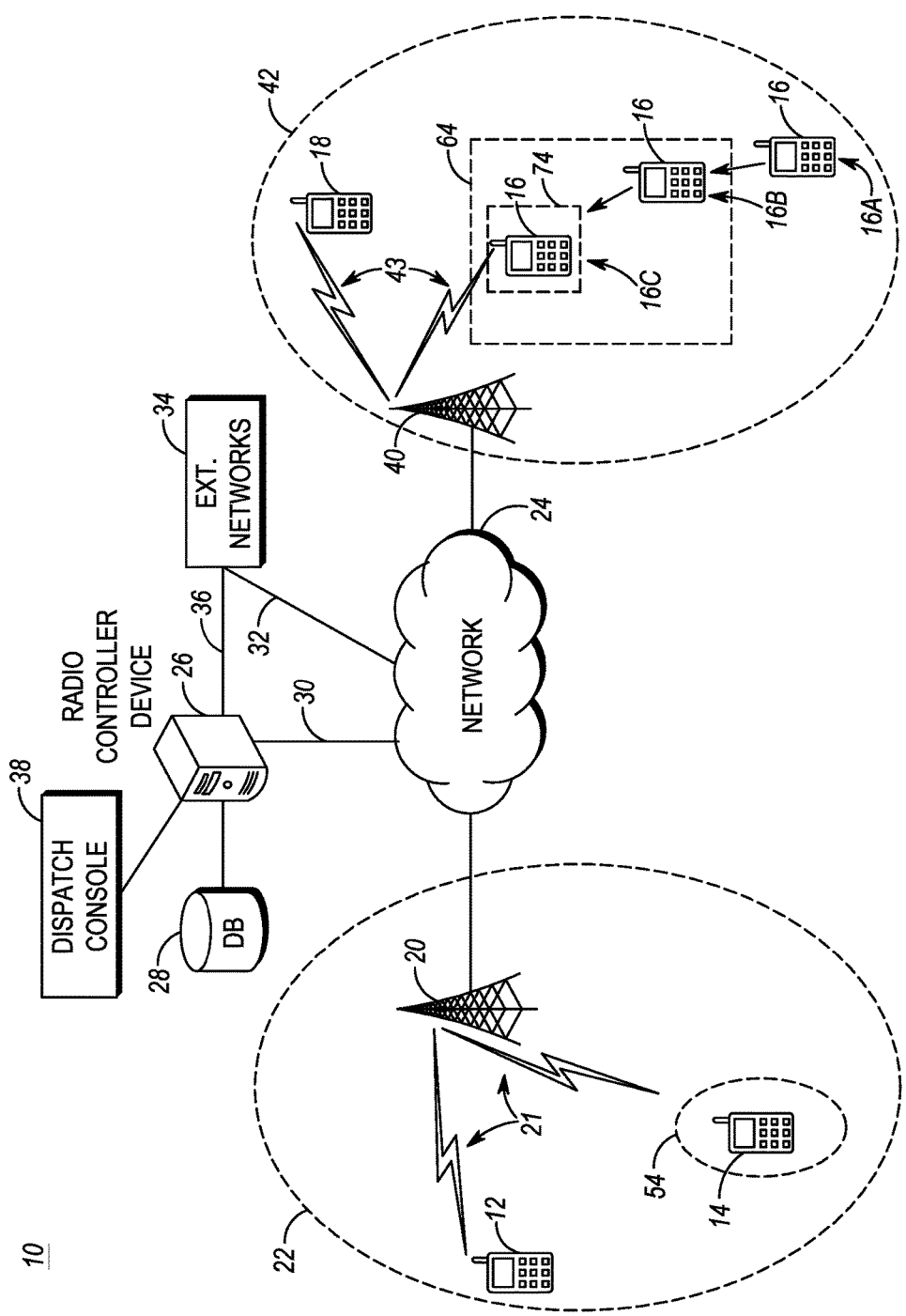
FIG. 1 is a block diagram of a wireless communications network in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed is an improved method, apparatus, and system for providing an intelligent and dynamic group scan capability across multiple overlapping geofences and their assigned talkgroups.

Each of the above-mentioned embodiments will be discussed in more detail below, starting with example network and device architectures of the system in which the embodiments may be practiced, followed by a discussion of processes for providing an intelligent and dynamic group scan capability across multiple overlapping geofence regions and their assigned talkgroups from mobile device and radio controller device perspectives. Further advantages and features consistent with this disclosure will be set forth in the following detailed description, with reference to the figures.

1. Network Architecture and Device Structure

FIG. 1 illustrates a communications network 10 including client mobile devices (e.g., MDs) 12, 14, 16, 18, fixed terminals 20, 40 (e.g. base stations), wireless links 21, 43, backhaul network 24, infrastructure radio controller 26 device (server), database 28, communications connections 30, 32, 36, dispatch console 38, and external networks 34. Each base station 20, 40 has at least one radio transmitter covering a radio coverage cell (22, 42). One or several MDs 12, 14, 16, 18 within radio coverage cells 22, 42 of the respective base stations 20, 40 may connect to the base stations 20, 40 using a wireless communication protocol via respective wireless links 21, 43. The MDs 12, 14, 16, 18 may communicate with each other, and perhaps other devices accessible via other network links, using a group communications protocol over wireless links 21, 43. Wireless links 21, 43 may be, for example, a wireless link supporting a protocol such as GPRS or UMTS, 2G, (e.g. GSM), 3G (e.g. WCDMA or LTE), iDEN, wireless LAN (WLAN), the P25 standard defined by the Association of Public-Safety Communications Officials 25 (APCO), or ETSI Digital Mobile Radio (DMR) or Terrestrial Trunked Radio (TETRA), among other possibilities. The MDs 12, 14, 16, 18 may be configured with an identification reference (such as an IMSI, International Mobile Subscriber Identity, or an SUID, Subscriber Unit Identifier) which may be connected to a physical media (such as a SIM card, Subscriber Identity Module).

Each MD 12, 14, 16, 18 may be a group communications device, such as a push-to-talk (PTT) device, that is normally maintained in a monitor only mode, and which switches to a transmit-only mode (half-duplex) or transmit and receive mode (full-duplex) upon depression or activation of a PTT input switch. The group communications architecture in communications network 10 allows a single MD, such as MD 14, to communicate with one or more members (such as MDs 12, 16-18) associated with a particular group of MDs at the same time. MDs 12, 14, 16, 18, base stations 20, 40, and/or an infrastructure controller (not shown) may cooperate to define groups of MDs and enable the one-to-many communications feature provided by communications network 10. As MDs are mobile, they may move within, into, out of, and/or between radio coverage cells 22, 42. For example, MD 14 may move from an initial location 14A within radio coverage cell 22 to a subsequent location 14B also within radio coverage cell 22. Similarly, MD 16 may move from an initial location 16A within radio coverage cell 42 to a secondary location 16B also within radio coverage cell 42, and then to a final location 16C also within radio coverage cell 42. Other examples are possible as well.

Although only four MDs and two base stations are illustrated in FIG. 1, the present disclosure is not limited as such, and more or fewer MDs and more or fewer base stations could be used in any particular implementation. Furthermore, while a single radio controller 26 device is illustrated in FIG. 1, more than one radio controller 26 may be used and/or a distributed radio controller 26 may be used that divides functions across multiple devices, perhaps for load balancing reasons. Finally, while database 28 is illustrated as directly coupled to radio controller 26, database 28 may also be remote from radio controller 26 and accessible to radio controller 26 via one or more of network 24 and/or external networks 34.

The base stations 20, 40 may be linked to the radio controller 26 via network 24 and communications connection 30. Network 24 may comprise one or more routers, switches, LANs, WLANs, WANs, access points, or other network infrastructure. For example, radio controller 26 may be accessible to base stations 20, 40 via a dedicated wireline or via the Internet. In one example, base stations 20, 40 may be directly coupled to radio controller 26 via one or more internal links under control of a single communications network provider.

Radio controller 26 may be a separate device configured to maintain and/or have access to a database of geofences including geofence definitions and geofence mapping information. Geofence definitions may include a unique geofence identifier and a respective geographic definition. Geofence mapping information may include, for each geofence definition, an assigned priority level selected out of a plurality of different priority levels and an assigned talkgroup selected out of a plurality of different talkgroups, among other possible information. The radio controller 26 may further provide mechanisms and/or interfaces for activating or de-activating existing geofences it is maintaining, for adding new geofence definitions and mapping information, for deleting existing geofence definitions, and for providing updates or modifications to current geofence definitions and/or geofence mapping information In other embodiments, radio controller 26 may be embodied within or coupled to another network device, such as a base station controller (BSC), mobile switching center (MSC), site controller, zone controller, Push-to-Talk controller, or other network device, inside network 24 or outside of network 24.

In some embodiments, database 28 may function to store geofence definitions and mapping information and provide them, upon request, to radio controller 26 and/or a MD such as MD 16. For example, database 28 may store a first geofence definition defining a first geofence 54 within radio coverage cell 22 and associated with base station 20, a second geofence definition defining a second geofence 64 that is partially within radio coverage cell 42 and associated with base station 42 (and perhaps another, adjacent base station, not shown), and a third geofence definition defining a third geofence 74 that is within (e.g., a sub-region of) geofence 64 and radio coverage cell 42 and is also associated with base station 40. Geofence geographic definitions may take the form of a set of three or more polygon vertices, where each polygon vertex is a GPS coordinate, such as a latitude and longitude pair, or some other form of cartographic definition. Additionally or alternatively, geofence geographic definitions may take the form of a point and radius, where the radius is a distance criterion and the point is a GPS coordinate, such as a latitude and longitude pair, or some other form of cartographic definition. Further, geofence geographic definitions may take the form of a set of two diagonally opposing rectangular vertices, where each rectangular vertex is a GPS coordinate, such as a latitude and longitude pair, or some other form of cartographic definition. Other possibilities exist as well.

The term 'talkgroup' is used in this specification to refer to a group of MD's. The term is not intended to be limited to group voice communications, but rather, to embody all possible group communications payloads, including but not limited to, voice, data, video, audio, audio/video, images, and/or any other type of media stream.

Furthermore, while the terms "group call" and "talkgroup" are used throughout the specification to refer to group call examples in a one-to-many group communication structure, in each example, the same or similar considerations can be applied to "group sessions" and "session-groups," respectively, when exchanging multimedia messages between group members. Such multimedia messages may include, but not be limited to, video, audio, audio/video, images, and any other type of media stream. Furthermore, the one-to-many group communication structure may utilize any one or more messaging protocols, including unicast, multicast, broadcast, or any combination thereof.

External networks 34 may also be accessible to base stations 20, 40 (and thus MDs 12, 14, 16, 18) via network 24 and communications connection 32 and/or geofence server 26 and communications connections 30, 36. External networks 34 may include, for example, a public switched telephone network (PSTN), the Internet, or another wireless service provider's network, among other possibilities.

Communications system 10 may implement, in one embodiment, a narrow-band conventional or trunked radio communication system in which MDs 12, 14, 16, 18 transmit control and data messages in accordance with an air interface protocol such as that defined by the ETSI DMR, TETRA, or P25 standards. In another embodiment, communications system 10 may implement a PTT over Cellular (OMA-PoC) or PTT over IP (PoIP) broadband architecture in which MDs 12, 14, 16, 18 transmit control and data messages in accordance with a protocol such as real-time transport protocol (RTP) and/or session initiation protocol (SIP). Other possibilities exist as well.

Dispatch console 38 may be directly coupled to radio controller 26 as shown, or may be indirectly coupled to radio controller 26 via one or more of network 24 and external networks 34. The dispatch console 38 may provide an administrative or dispatch access to MDs 12, 14, 16, 18 and radio controller 26, and allow an administrator or dispatcher to initiate infrastructure-sourced group communications to groups of MDs 12, 14, 16, 18, among other features and functions.

Figure 2:
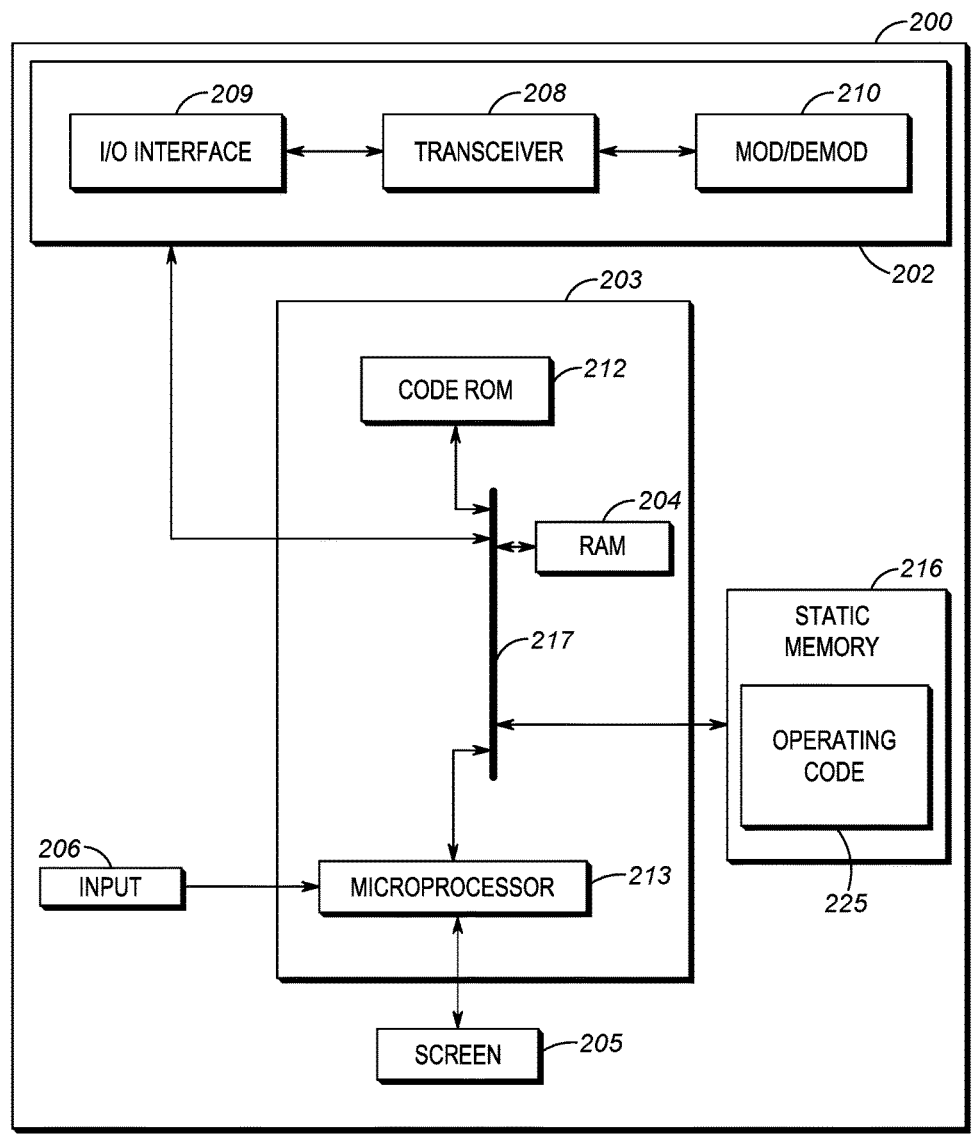
FIG. 2 is a block diagram of an infrastructure radio controller device in accordance with some embodiments.

Referring to FIG. 2, a schematic diagram illustrates a radio controller 200 according to some embodiments of the present disclosure. Radio controller 200 may be, for example, the same as or similar to the radio controller 26 of FIG. 1. As shown in FIG. 2, radio controller 200 includes a communications unit 202 coupled to a common data and address bus 217 of a processing unit 203. The radio controller 200 may also include an input unit (e.g., keypad, pointing device, etc.) 206 and a display screen 205, each coupled to be in communication with the processing unit 203.

The processing unit 203 may also include a code Read Only Memory (ROM) 212 for storing data for initializing system components. The processing unit 203 may further include a microprocessor 213 coupled, by the common data and address bus 217, to a Random Access Memory (RAM) 204 and a static memory 216 (i.e., a data store). The microprocessor 213 has ports for coupling to the input unit 206 and to the display screen 205.

The communications unit 202 may include one or more wired or wireless input/output (I/O) interfaces 209 that are configurable to communicate with base stations such as base stations 20, 40 of FIG. 1, with other devices in the communications network 10, and/or with the dispatch console 38. The communications unit 202 may include one or more wireless transceivers 208, such as a DMR transceiver, an APCO P25 transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, and/or other similar type of wireless transceiver configurable to communicate via a wireless network. The communications unit 202 may alternatively or additionally include one or more wireline transceivers 208, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 208 is also coupled to a combined modulator/demodulator 210.

Figure 4:
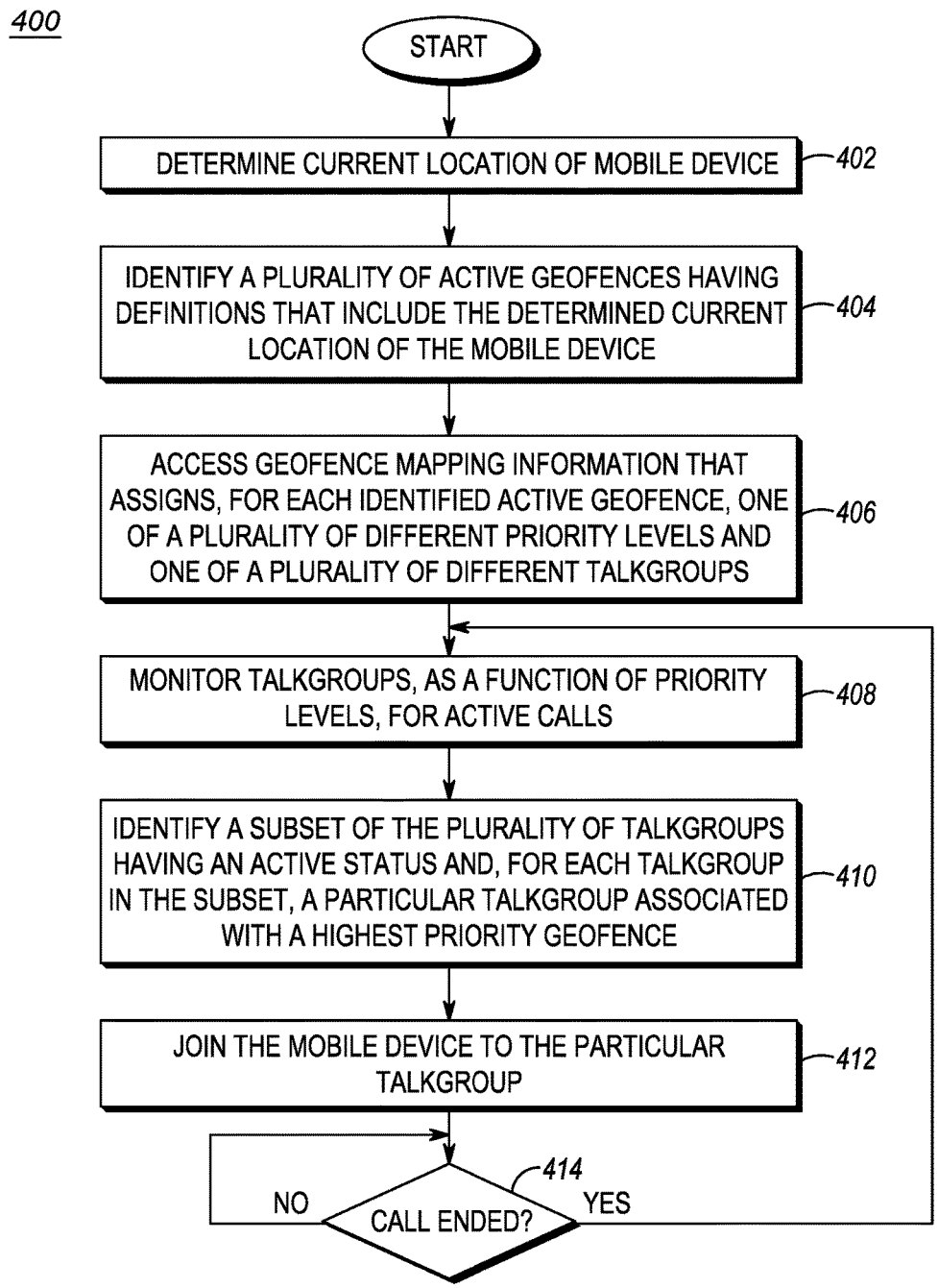
FIG. 4 includes a flow diagram illustrating a process that may be implemented at a radio controller device of FIG. 1 or 2 and/or at a mobile device of FIG. 1 or 3 to provide an intelligent and dynamic group scan capability across multiple overlapping geofence regions and their associated talkgroups, in accordance with an embodiment.
Figure 5:
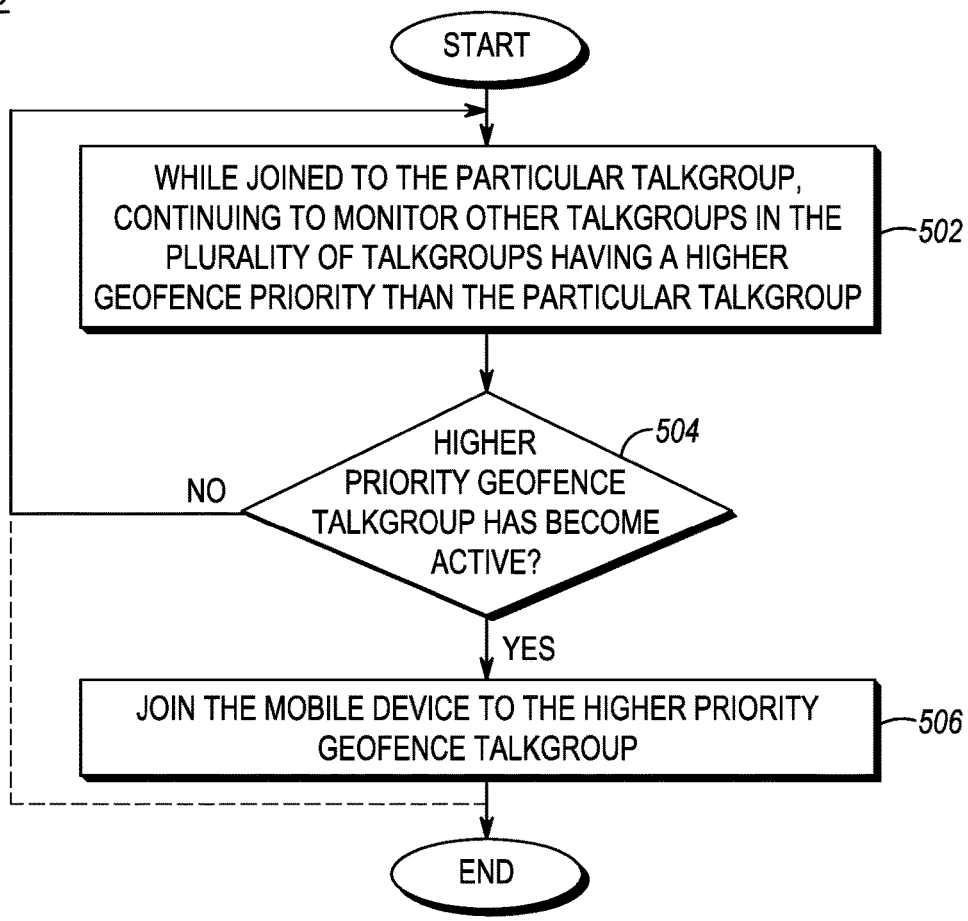
FIG. 5 includes a flow diagram illustrating a process that may be implemented at a radio controller device of FIG. 1 or 2 and/or at a mobile device of FIG. 1 or 3 for scanning higher priority geofence talkgroups while the mobile device is joined to an active call on a particular talkgroup, in accordance with an embodiment.
Figure 6:
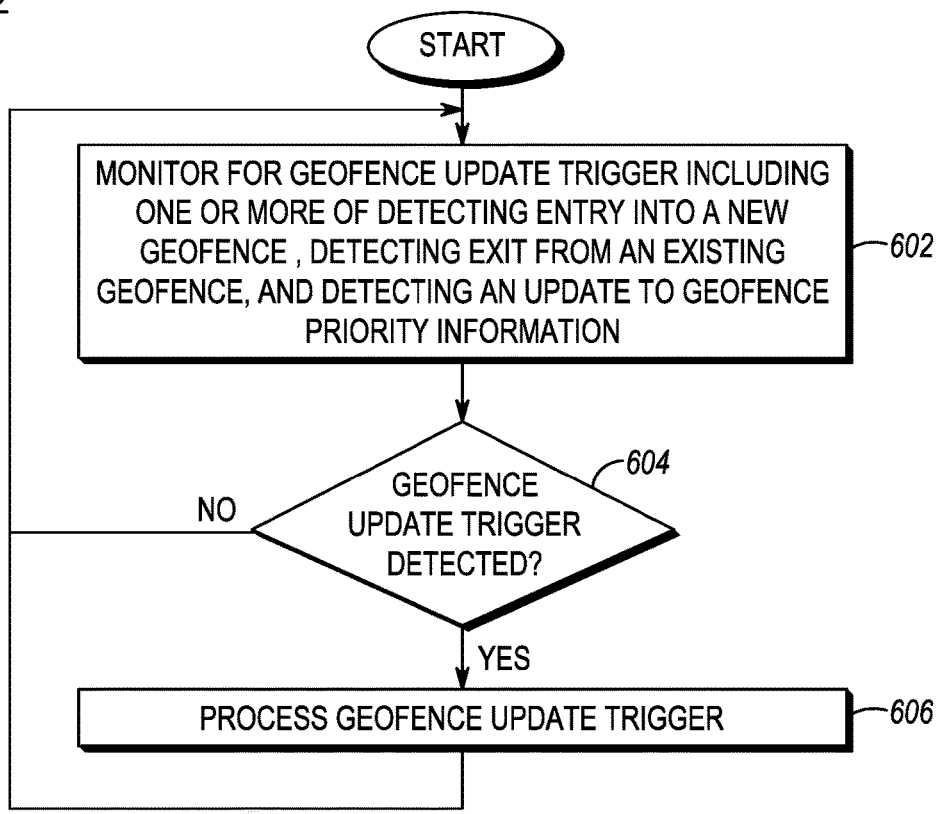
FIG. 6 includes a flow diagram illustrating a process that may be implemented at a radio controller device of FIG. 1 or 2 and/or at a mobile device of FIG. 1 or 3 for processing geofence updates while monitoring channels or while the mobile device is joined to an active call on a particular talkgroup, in accordance with an embodiment.

Static memory 216 may store operating code 225 for the microprocessor 213 that, when executed, performs one or more of the radio controller steps described with respect to FIGS. 4-6 and corresponding text. Static memory 216 may comprise, for example, a hard-disk drive (HDD), an optical disk drives such as a compact disk (CD) drive or digital versatile disk (DVD) drive, a solid state drive (SMD), a tape drive, a flash memory drive, or a tape drive, to name a few.

Figure 3:
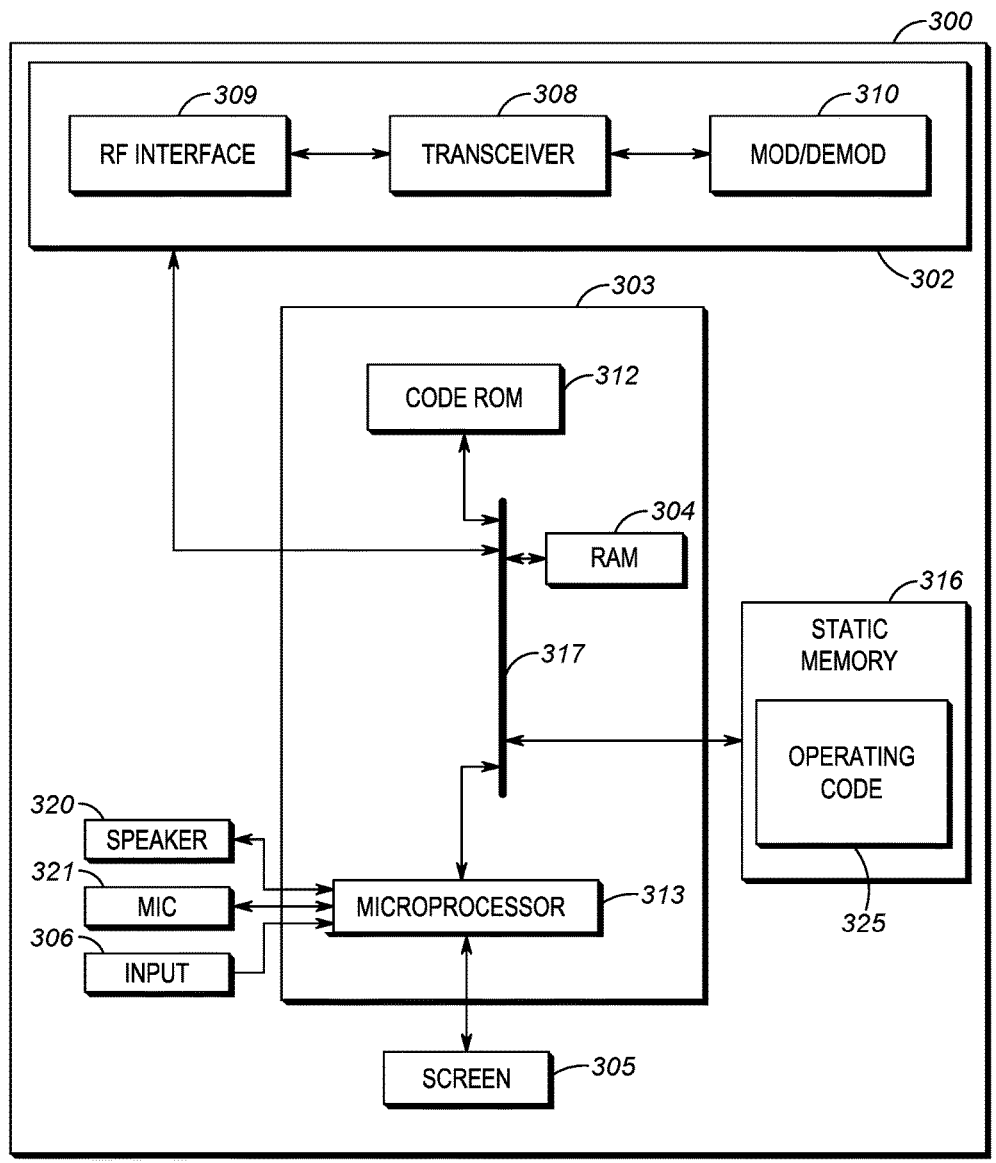
FIG. 3 is a block diagram of a mobile device in accordance with some embodiments.

FIG. 3 is an example functional block diagram of a MD 300, which may be the same or similar as MD 16, operating within the communications system 10 of FIG. 1 in accordance with some embodiments. Other MDs such as MDs 12, 14, and 18 may contain same or similar structures. As shown in FIG. 3, MD 300 includes a communications unit 302 coupled to a common data and address bus 317 of a processing unit 303. The MD 300 may also include an input unit (e.g., keypad, pointing device, etc.) 306, an output transducer unit (e.g., speaker) 320, an input transducer unit (e.g., microphone) 321, and a display screen 305, each coupled to be in communication with the processing unit 303.

The processing unit 303 may include a code ROM 312 for initializing system components. The processing unit 303 may further include a microprocessor 313 coupled, by the common data and address bus 317, to a RAM 304 and a static memory 316. The microprocessor 313 has ports for coupling to the display screen 305, the input unit 306, the speaker 320, and the microphone 321.

The communications unit 302 may include an RF interface 309 configurable to communicate with other MDs within its communication range and with base stations within its communication range such as base stations 20, 40 of FIG. 1. The communications unit 302 may include one or more wireless transceivers 308, such as an APCO P25 transceiver, a DMR transceiver, a TETRA transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, an LTE transceiver, and/or other similar type of wireless transceiver configurable to communicate via a wireless network. The transceiver 308 is also coupled to a combined modulator/demodulator 310.

Static memory 316 may store operating code 325 for the microprocessor 313 that, when executed, performs one or more of the mobile device steps set forth in FIGS. 4-6 and corresponding text. Static memory 316 may comprise, for example, a HDD, an optical disk drives such as a CD drive or DVD drive, a SMD, a tape drive, a flash memory drive, or a tape drive, to name a few.

2. Processes for Providing Group Scan Across Multiple

Overlapping Geofence Regions

FIGS. 4-6 set forth flow charts illustrating processes 400, 500, 600 that may be implemented at a MD such as the MD 16 of FIG. 1 or MD 300 of FIG. 3, and/or at a radio controller device such as the radio controller 26 of FIG. 1 or the radio controller 200 of FIG. 2, to provide group scan across multiple overlapping geofence regions and their associated talkgroups consistent with the present disclosure. Of course, additional steps not disclosed herein could be additionally added before, after, or in-between steps disclosed in FIGS. 4-6, and the presence of such additional steps would not negate the purpose and advantages of the examples set forth in detail throughout the remainder of this disclosure.

At step 402, one of the radio controller and MD determines a current location of the MD. In one embodiment, the MD may calculate its geographic location using a satellite-based triangulation process (perhaps via a GPS receiver or application, or similar satellite-based system such as GLONASS, GNSS, or Compass) or via a terrestrial-based triangulation process. This location information determined at the MD (such as the MD 16 of FIG. 1) may then be stored locally and used by the MD in subsequent steps of processes 400, 500, 600, or may be reported to the radio controller (such as the radio controller 26 of FIG. 1) and used by the radio controller in subsequent steps of processes 400, 500, 600. In still other embodiments, the radio controller may determine the location of the MD using an infrastructure-based triangulation process via reception of signals transmitted by the MD and calculation of a time-difference of arrival of these signals at a plurality of base stations. The infrastructure-determined location of the MD may then be stored at the radio controller or a database (such as the database 28 of FIG. 1) accessible to the radio controller for use in subsequent steps of processes 400, 500, 600, or may be transmitted to the MD and stored at the MD for use in subsequent steps of processes 400, 500, 600.

At step 404, the one of the radio controller and MD identifies a plurality of active geofences having geographic definitions that include the determined current location of the MD. The radio controller and/or the MD may store the geographic definitions locally, or may access them via an external database (such as database 28). In some embodiments, the geographic definitions may be provisioned and/or pre-configured at each MD by a manufacturer or system administrator, may be provided to each MD over-the-air by a serving base station, may be manually entered or updated via a user interface (for example, input unit 306 and display screen 305 of MD 300 of FIG. 3 or input unit 206 and display screen 205 of radio controller 200 of FIG. 2), or may be populated via a combination of any of the foregoing. Geofence geographic definitions, independent of where they are stored or accessed, may take a form that is the same or similar to that set forth above with respect to geographic definitions stored at radio controller 26 and/or database 28.

For example, geofence geographic definitions may be set forth in a geofence look-up table similar to the look-up table set forth in Table I below.

TABLE I

EXAMPLE GEOFENCE DEFINITION LOOK-UP TABLE

| Geofence ID | Type | Definition |
|---|---|---|
| 0 | Point + Radius | Point: +42.07, −88.05 |
| | | Radius: 1 km |
| 1 | Rectangular | Vertex 1: +42.5, −88.5 |
| | | Vertex 2: +42, −87.7 |
| 2 | Polygon | Vertex 1: +42.5, −88.5 |
| | | Vertex 2: +42.5, −87.7 |
| | | Vertex 3: +42, −87.7 |

As illustrated in Table I, a geofence database may include a look-up table defining three geofences of a particular differing type and having geofence ID's of 0-2. While Table I illustrates three geofence geographic definitions using three different types of geographic definitions for exemplary purposes only, in other embodiments, a single type of geographic definition could be used consistently throughout the geofence database, and more or less than three geofence geographic definitions may be set forth. In Table 1, geofence ID 0 is illustrated as having a point+radius type geographic definition having a central point at latitude/longitude +42.07,−88.05 and covering a radius extending from that central point by a distance of 1 km. Geofence ID 1 is illustrated as having a rectangular type geographic definition having two defined diagonal opposing vertices at latitude/longitude +42.5,−88.5 and +42,−87.7. Geofence ID 2 is illustrated as having a polygonal type geographic definition having three defined vertices (e.g., a triangle in this case) at latitude/longitude +42.5,−88.5, +42.5, −87.7, and +42,−87.7. In some embodiments, an indication may also be included of which base station's radio coverage cells the geofence is fully or partially located in (not shown). Base station associations could be used by MDs to limit the number of geofence boundaries it checks its current location against based on the base station with which it is currently attached, among other possibilities. Other ways of storing geofence geographic definitions could be used in addition to or in place of the example look-up table set forth in Table I above.

Once geofence geographic definitions are accessed or retrieved, the one of the radio controller and MD compares the current location of the MD determined at step 402 with the geofence definitions and determines, of those geofences that are retrieved and/or indicated as active, which geofences the MD is currently located within. In some embodiments, the mere presence of a geofence and its definition in the database retrieved or accessed at step 404 is an indication that the corresponding geofence is active (in which case, the geofence and its definition is simply removed or deleted from the database when deactivated). In those cases where geofences are marked active or inactive instead of being added/created or removed/deleted from the geofence database, the one of the radio controller and MD only retrieves or accesses the geofences currently marked as active (or not marked as inactive).

Each unique geofence and its associated geofence geographic definition may be identified by a unique name, a unique index number (as in Table I above), a unique identifier, or via some other differentiating technique. In some examples, and as set forth in FIG. 1, a MD such as MD 12 may be present in no active geofences, while an MD such as MD 14 may be present within a single active geofence 54. In a still further example, a MD such as MD 16 may be present in no active geofences at an initial location 16A, within a single active geofence 64 at a second subsequent location 16B, and within two or more active geofences 64, 74 at a third subsequent location 16C. Other variations of movement in and out of overlapping geofences, other overlapping configurations of geofences, and other quantities of geofences and MDs are possible as well.

In an example where MD 16 is at location 16C, the one of the MD and radio controller will, at step 404, use the MD's 16 determined location to identify active geofences 64, 74 having geographic definitions that cover the MD's 16 location 16C. In the example set forth in FIG. 1, geofences 54, 64, 74 may be associated with entirely different incident scenes or may be associated with different functions or responding units of a same incident scene. Geofence 74, for example, may be associated with a particular sub-region or specialty area of a broader incident scene defined by geofence 64. Such an arrangement may be useful in segmenting functions such as hostage negotiation or traffic control from other functions such as crowd control and incident recreation, or may be useful in segmenting an initial incident area (e.g., the starting place of an incident or where a first portion of an incident occurred) with a subsequent incident area (e.g., the ending place of the incident or where a second portion of the incident occurred).

At step 406, the one of the radio controller and MD accesses geofence mapping information that assigns, for each identified active geofence, one of a plurality of different priority levels and one of a plurality of different talkgroups. Priority levels may be assigned to geofences in a number of different ways and may take a number of different forms. For example, priority levels may be textual descriptions that may take the form of "high," "medium," or "low." In other embodiments, priority levels may be numerical representations that take the form of a lower number such as 1 for the highest priority and a higher number such as 5, 10, or 100 for the lowest priority (or vice versa). Other representations are possible as well. Geofences associated with incidents having an active shooter or involving a potential further loss of life or severe injury may be assigned a highest priority such as 1, while geofences associated with incidents involving a trespassing or property damage may be assigned a lower priority such as 5 or 10. Talkgroups assigned to geofences may be identified by name (such as "FireOne" or "XYPolice"), may be identified by talkgroup identifier (such as a color code or assigned alphanumeric identifier), may be identified by an index (such as a sequential numerical identifier), or may be identified by assigned radio channel (such as an identity of the conventional radio channel on which the talkgroup is assigned), among other possibilities.

TABLE II

EXAMPLE GEOFENCE MAPPING

| GEOFENCE ID | GEOFENCE PRIORITY | TG CHANNEL ASSIGNED |
| --- | --- | --- |
| 0 | 1 (HIGHEST PRIORITY) | TG 0X3001 |
| 1 | 3 | TG 0x3002 |
| 2 | 5 (LOWEST PRIORITY) | TG 0x3003 |

Table II above sets forth an example geofence mapping information that may be accessed and/or retrieved at step 406. As illustrated in Table II, geofence mapping information may include a look-up table for the same three geofences of Table I, setting forth, for each active geofence identified in step 404, an associated geofence priority (1 to 5) and associated talkgroup. For example, geofence ID 0 of Table II may be associated with geofence 54 of FIG. 1, geofence ID 1 of Table II maybe associated with geofence 64 of FIG. 1, and geofence ID 2 of Table II may be associated with geofence 74 of FIG. 1. MD 16, while at location 16C, would thus be within two geofences (IDs 1 and 2) having relative priorities of 3 and 5 and having associated talkgroups TG 0x3002 and TG 0x3003, respectively. Of course, other ways of storing geofence mapping information could be used in addition to or in place of the example look-up table set forth in Table II above.

At step 408, the one of the radio controller and MD monitors, as a function of the priority levels of the identified active geofences, the plurality of different talkgroups in the geofence mapping information for active calls.

Using the example set forth above with respect to Table II and MD 16 of FIG. 1, in one embodiment, MD 16 may monitor talkgroups TG 0x3002 and TG 0x3003 (e.g., those talkgroups associated with active geofences within which MD 16 resides) to determine if either talkgroup has an active call (e.g., currently has an already active call or is about to have an active call such as when a call has been granted but has not started exchanging payload audio/video/data for the call).

In an example where communications network 10 implements a conventional radio LMR architecture, monitoring for an active call on the talkgroups TG 0x3002 and TG 0x3003 may involve the MD 16 scanning, via a primary transceiver, each conventional radio channel associated with talkgroups TG 0x3002 and TG 0x3003 (which radio channel may be stored in the geofence mapping itself as the talkgroup identifiers TG 0x3002 and TG 0x3003, or which may be determined via a talkgroup to radio channel mapping stored at the MD 16) and attempt to detect a carrier (e.g., a signal) or control or data messaging associated with an active call or call grant on each radio channel. In one embodiment, the MD 16 may sequentially scan the corresponding radio channels in order from highest priority to lowest priority one or more times. In other examples, the MD 16 may scan the corresponding higher priority radio channels more often or in-between each sequentially lower priority scanned radio channel, among other possibilities. In still other examples, the MD 16 may monitor the highest priority talkgroup radio channel with a primary transceiver, and monitor the remaining lower priority talkgroup radio channel(s) in a prioritized sequential fashion with a secondary receiver.

In an example where communications network 10 implements a trunked radio LMR architecture, monitoring for an active call on the talkgroups TG 0x3002 and TG 0x3003 may involve the MD 16 tuning to a known control or rest channel, via a primary transceiver, and monitoring call grants or active call status messages transmitted on the control or rest channel. The MD 16 may then parse a received call status message and/or call grant to determine which talkgroups currently have active calls, if any.

In a still further embodiment where communications network 10 implements a broadband communications network, and still using the example set forth above with respect to Table II and MD 16, radio controller 26 may monitor talkgroup streams itself (if it is also the PTT server in the infrastructure) or via messaging with a separate PTT server in the infrastructure, and determine if either of the talkgroups TG 0x3002 and TG 0x3003 currently has an active call or is about to have an active call (e.g., has received a call grant). In the case where the radio controller 26 performed step 406, the radio controller subsequently performs the talkgroup monitoring, as a function of the priority levels, as a result of the plurality of different talkgroups identified at step 406. In the case where the MD 16 performed step 406, the MD 16 must dynamically subscribe to the plurality of different talkgroups via control messaging with the radio controller 26 and/or PTT server, the control messaging including the corresponding priority levels of the talkgroups requested to be subscribed to so that radio controller 26 may perform the monitoring at step 408.

At step 410, the one of the radio controller and MD identifies, via the monitoring of step 408, a subset of the plurality of different talkgroups in the geofence mapping having an active call or call grant and, for each talkgroup in the subset, identifies a particular talkgroup associated with a highest priority geofence.

Again using the example set forth above with respect to Table II and MD 16, and where the communications network 10 implements a conventional LMR network, the subset includes the first talkgroup the MD 16 encounters having an active call or call grant using the prioritized radio channel scanning method set forth above and the particular talkgroup is that first talkgroup. For example, since TG 0x3002 is associated with a geofence having a higher assigned priority than the geofence associated with TG 0x3003, the MD 16 scans TG 0x3002 first, for a longer period of time, more often than, or via a separate primary transceiver compared to TG 0x3003, and when a new active call appears on TG 0x3002, the MD 16 identifies the TG 0x3002 as the particular talkgroup associated with a highest priority geofence. Accordingly, even if TG 0x3003 had an active call at the same time as TG 0x3002 or received a call grant at substantially a same time as TG 0x3002, it is likely that the MD

16 will first identify the active call or call grant on TG 0x3002. Alternatively, if no active call or call grant is detected on TG 0x3002, and the MD 16 detects an active call or call grant on TG 0x3003 (via less frequent or sequentially subsequent scanning of TG 0x3003, and/or via a secondary receiver), the MD 16 may identify TG 0x3003 as the subset and as the particular talkgroup.

Again using the example set forth above with respect to Table II and MD 16, and where the communications network 10 implements a trunked LMR network, the subset includes all talkgroups associated with active geofences within which the MD resides and indicated in the control channel or rest channel messaging as including an active call or call grant. The MD 16, for example, may receive a call status messaging or one or more call grants indicating both TG 0x3002 and 0x3003 have active calls or have received call grants. The MD 16 may then access the geofence mapping information and identify the TG 0x3002 as the particular talkgroup associated with a highest priority geofence. On the other hand, if the call status messaging or call grants indicated that only 0x3003 had an active call or call grant, the MD 16 may identify 0x3003 as the subset and the particular talkgroup.

Again using the example set forth above with respect to Table II and MD 16, and where the communications network 10 implements a broadband network, the subset includes all talkgroups associated with active geofences within which the MD resides and indicated at the PTT server (e.g., at the radio controller itself acting as the PTT server as well or at the separate PTT server) as including an active call or call grant. The MD or radio controller may then identify the particular talkgroup as that talkgroup from the subset associated with a highest priority geofence.

For example, the radio controller 26 may receive an indication that talkgroups 0x3002 and 0x3003 have an active call or call grant (e.g., the subset), and the radio controller 26 may then access the geofence mapping information's priority levels (stored locally or received from the MD 16) and identify the TG 0x3002 as the particular talkgroup associated with a highest priority geofence. If, instead, radio controller 26 had determined that talkgroup TG 0x3002 did not have an active call but TG 0x3003 did, radio controller 26 would identify talkgroup TG 0x3003 as being the particular talkgroup associated with a highest priority geofence in the subset.

At step 412, the one of the radio controller and MD joins the MD to the particular talkgroup identified in step 410. In an embodiment where the MD is operating in a trunked or conventional LMR network and the MD identified the particular talkgroup at step 410, the MD switches its own transceiver to the conventional or trunked radio channel associated with the particular talkgroup. For example, and using the example set forth above with respect to Table II and MD 16, the MD 16 switches its own transceiver to the conventional or trunked radio channel associated with TG 0x3002.

In an embodiment where the MD is operating in a broadband network and the radio controller identified the particular talkgroup at step 410, the radio controller may automatically route call media for the particular talkgroup to the MD. For example, and using the example set forth above with respect to Table II and MD 16, the radio controller 26 routes the media associated with TG 0x3002 to MD 16.

At step 414, the one of the radio controller and MD determines if the active call on the particular talkgroup joined at step 412 has ended, and if not, the MD may continue to participate in the particular talkgroup call. If, on the other hand, the particular talkgroup call has ended, processing may return to step 408, where a different talkgroup may be subsequently identified and joined.

FIG. 5 sets forth a further process 500 that may be implemented between steps 412 and 414 of FIG. 4, in other words, while the MD is joined to an active call on the particular talkgroup, for scanning higher priority geofence talkgroups.

At step 502, the one of the radio controller and MD, while the MD is joined to the particular talkgroup, continues to monitor other talkgroups in the plurality of talkgroups having a higher priority than the particular talkgroup. For example the MD, while joined to the particular talkgroup, may periodically and opportunistically switch from a radio channel associated with the particular talkgroup to one or more radio channels associated with other talkgroups in the plurality of talkgroups having a higher priority than the particular talkgroup to determine if any of the other talkgroups having a higher priority have become active.

Again using the example set forth above with respect to Table II and MD 16, and where the communications network implements a conventional LMR system, while the MD 16 is joined to the talkgroup call TG 0x3003 on a first conventional radio channel, it may periodically and opportunistically (during off-slots or during silent periods in an audio stream, among other possibilities) switch from the conventional radio channel associated with TG 0x3003 and check the conventional radio channel associated with TG 0x3002 (for signal, messaging, grants, etc. indicating an active call on the higher priority TG 0x3002).

Again using the example set forth above with respect to Table II and MD 16, and where the communications network implements a trunked LMR system, while the MD 16 is joined to the talkgroup call TG 0x3003 on a first trunked radio channel, it may periodically and opportunistically (during off-slots or during silent periods in an audio stream, among other possibilities) switch from the first trunked radio channel associated with TG 0x3003 and check the control or rest channel associated with the trunked LMR system (for call grants, call status messages, etc. indicating an active call on the higher priority TG 0x3002). Alternatively, and in some embodiments, the trunked LMR system may embed call status information for other talkgroups in embedded link control (LC) messages embedded in the media stream for the active call on the first trunked radio channel on which the TG 0x3003 call is being conducted, allowing the MD 16 to determine if a call has started on the higher priority TG 0x3002 talkgroup without switching away from the first trunked radio channel.

Again using the example set forth above with respect to Table II and MD 16, and where the communications network implements a conventional or trunked LMR system and the MD 16 includes a primary transceiver and a secondary receiver, the MD may stay joined (via the primary transceiver) to the ongoing particular talkgroup call (TG 0x3003) while periodically and opportunistically monitoring, via a second receiver, radio channels associated with other talkgroups in the plurality of talkgroups having a higher priority than the particular talkgroup to determine if any of the other talkgroups having a higher priority have become active. The radio channels associated with other talkgroups may include other conventional LMR radio channels associated with a conventional radio communication network or a control or rest channel associated with a trunked LMR communication network.

Again using the example set forth above with respect to Table II and MD 16, and where the communications network implements a broadband communications network, the radio controller device may itself monitor, or may monitor via messaging with a separate PTT sever in the infrastructure, other talkgroups in the plurality of talkgroups having a higher priority than the particular talkgroup to determine if any of the other talkgroups in the plurality of talkgroups having a higher priority have become active.

At step 504, the one of the radio controller and MD, while the MD is joined to the particular talkgroup, determines whether a talkgroup associated with a higher priority geofence (compared to the priority of the geofence associated with the particular talkgroup) has become active. If not, processing returns to step 502. If such a higher priority geofence's talkgroup is identified as becoming active, however, processing proceeds to step 506, where the one of the radio controller and MD causes the MD to leave the particular talkgroup and join the higher priority geofence's talkgroup. Processing may then return to step 502 where the one of the radio controller and MD monitors for talkgroups associated with even higher priority geofences.

FIG. 6 sets forth a further process 600 for processing geofence updates that may be implemented between steps 412 and 414 of FIG. 4, in other words, while the MD is joined to an active call on the particular talkgroup, or during step 408 of FIG. 4, in other words, while the talkgroups are being monitored for active calls but none have yet to be started.

At step 602, the one of the one of the radio controller and MD monitors for a geofence update trigger, which may include one or more of detecting the MD's entry into a new geofence, detecting the MD's exit from an existing geofence, detecting an update to one or more geofence's assigned priorities, detecting an addition of or enabling of a new geofence definition and associated geofence mapping information, and detecting removal of or disabling of an existing geofence definition and associated geofence mapping information, among other possibilities.

At step 604, the one of the radio controller and MD determines if a trigger monitored for in step 602 has been detected. For example, such geofence triggers may be triggered by a wireless or wired reception of information described above with respect to step 602, by a data entry via an input and/or display interface of information described above with respect to step 602, or by some other action affecting the information described above with respect to step 602. If no update trigger is detected at step 604, processing proceeds back to step 602. If, however, such an update trigger is detected at step 604, processing proceeds to step 606 where the one of the one of the radio controller and MD processes the update.

At step 606, the one of the one of the radio controller and MD processes the update and determines if it affects any talkgroup calls it should now be in or that it is already involved in.

For example, if the update trigger is associated with a determination that the MD has crossed a geofence boundary and entered a new geofence or that a new geofence has been added to or enabled in the database, the one of the radio controller and MD may responsively add (or enable if previously present but disabled) the new geofence as an active geofence in the geofence database, including adding or enabling the new geofence and its associated priority level and associated talkgroup to the geofence mapping information. If the MD is already joined to a particular talkgroup (e.g., process 600 is being executed between steps 412 and 414 of FIG. 4), the one of the radio controller and MD may also determine if the new geofence's associated priority level is higher than the geofence priority associated with the particular talkgroup and, if so, cause the MD to leave the call associated with the particular talkgroup and join the talkgroup associated with the new active geofence.

As a further example, if the update trigger is associated with a determination that the MD has crossed out of a geofence boundary and exited an existing geofence in the geofence database and geofence mapping or that an existing geofence has been removed from or disabled in the database, the one of the radio controller and MD may responsively remove (or disable if previously enabled) the existing geofence as an active geofence in the geofence database, including removing or disabling the existing geofence and its associated priority level and associated talkgroup from the geofence mapping information. If the MD is already joined to a particular talkgroup and the particular talkgroup is associated with the existing geofence being exited (e.g., process 600 is being executed between steps 412 and 414 of FIG. 4), the one of the radio controller and MD may also cause the MD to leave the call and return to step 408 to monitor remaining geofence talkgroups for active calls. If a lower priority geofence's talkgroup is determined to have an active call, the MD may then be joined to that lower priority geofence's talkgroup.

As a final example, if the update trigger is associated with a modification to one or more priority levels of existing geofences in the geofence mapping, the one of the radio controller and MD may responsively modify the geofence mapping information. If the MD is already joined to the particular talkgroup (e.g., process 600 is being executed between steps 412 and 414 of FIG. 4), the one of the radio controller and MD may also determine if the new priority levels affect the MD's continued involvement in the particular talkgroup. In other words, the one of the radio controller and MD may determine whether the modification(s) to the priority levels degrade the priority level of the particular talkgroup below other active talkgroups associated with higher priority geofences, or whether the modification(s) to the priority levels upgrade the priority level of geofences having active talkgroup calls above that of the priority level of the geofence associated with the particular talkgroup. If so, the one of the radio controller and MD may cause the MD to leave the call associated with the particular talkgroup and join the talkgroup associated with the newly higher priority level geofence.

3. Conclusion

In accordance with the foregoing, an improved method, apparatus, and system for providing an intelligent and dynamic group scan capability across multiple overlapping geofence regions. As a result, a more flexible, robust, and adaptable system can be provided for mobile devices roaming across multiple geofences and associated talkgroup regions. Other advantages and benefits are possible as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for providing group scan for mobile devices located in overlapping active geofences, the method comprising, at one of a mobile device and a radio controller device in an infrastructure associated with the mobile device:
   determining, by the one of the mobile device and the radio controller device, a current location of the mobile device;
   identifying, by the one of the mobile device and the radio controller device, a plurality of active geofences having definitions that include the determined current location of the mobile device;
   accessing, by the one of the mobile device and the radio controller device, a geofence mapping that assigns, for each of the identified plurality of active geofences, one of a plurality of different priority levels and one of a plurality of different talkgroups;
   monitoring, by the one of the mobile device and the radio controller device, each of the plurality of different talkgroups for active calls as a function of the different priority levels;
   identifying, by the one of the mobile device and the radio controller device, a subset of the plurality of different talkgroups from the plurality of different talkgroups in the geofence mapping having an active call and, for each talkgroup in the subset, a particular talkgroup associated with a highest priority geofence;
   joining the mobile device, by the one of the mobile device and the radio controller device, to the particular talkgroup; and
   adding or enabling, by the one of the mobile device and the radio controller device, a new active geofence, its associated priority level, and its associated talkgroup in the geofence mapping when the mobile device has crossed a geofence boundary into the new active geofence.

2. The method of claim 1, further comprising, after joining the particular talkgroup and while the mobile device is still joined to the particular talkgroup:
   periodically and opportunistically changing, by the mobile device, from a radio channel associated with the particular talkgroup to one or more radio channels associated with other talkgroups in the plurality of talkgroups having a higher priority than the particular talkgroup to determine if any of the other talkgroups in the plurality of talkgroups having a higher priority have become active.

3. The method of claim 2, wherein the mobile device operates in a conventional push-to-talk (PTT) radio system, and the one or more radio channels associated with the other talkgroups in the plurality of talkgroups are other conventional radio channels in the conventional PTT radio system.

4. The method of claim 2, wherein the mobile device operates in a trunked PTT radio system, and the one or more radio channels associated with the other talkgroups in the plurality of talkgroups is a control or rest channel of the trunked PTT radio system.

5. The method of claim 2, further comprising, responsive to determining that a second particular talkgroup in the plurality of talkgroups having a higher priority than the particular talkgroup has become active, switching, by the mobile device, from the radio channel associated with the particular talkgroup to the radio channel associated with the second particular talkgroup.

6. The method of claim 1, further comprising, after joining the particular talkgroup and while the mobile device is still joined to the particular talkgroup via a first transceiver of the mobile device:
periodically and opportunistically changing, by the mobile device, via a second receiver at the mobile device, radio channels associated with other talkgroups in the plurality of talkgroups having a higher priority than the particular talkgroup to determine if any of the other talkgroups in the plurality of talkgroups having a higher priority have become active.

7. The method of claim 6, further comprising, responsive to determined that a second particular talkgroup in the plurality of talkgroups having a higher priority than the particular talkgroup has become active, switching, by the mobile device, the first transceiver from the radio channel associated with the particular talkgroup to the radio channel associated with the second particular talkgroup.

8. The method of claim 1, further comprising, after joining the particular talkgroup and while the mobile device is still joined to the particular talkgroup:
monitoring, by the mobile device, on a radio channel associated with the particular talkgroup for embedded link control packets identifying a call status of one or more radio channels associated with other talkgroups in the plurality of talkgroups having a higher priority than the particular talkgroup to determine if any of the other talkgroups in the plurality of talkgroups having a higher priority have become active.

9. The method of claim 8, further comprising, responsive to determining that, via the embedded link control packets, a second particular talkgroup in the plurality of talkgroups having a higher priority than the particular talkgroup has become active, switching, by the radio controller device, the mobile device from the particular talkgroup to the second particular talkgroup.

10. The method of claim 1, further comprising after joining the particular talkgroup and while the mobile device is still joined to the particular talkgroup:
monitoring, by the radio controller device, other talkgroups in the plurality of talkgroups having a higher priority than the particular talkgroup to determine if any of the other talkgroups in the plurality of talkgroups having a higher priority have become active.

11. The method of claim 10, further comprising, responsive to determining that a second particular talkgroup in the plurality of talkgroups having a higher priority than the particular talkgroup has become active, switching, by the radio controller device, the mobile device from the particular talkgroup to the second particular talkgroup.

12. The method of claim 1, further comprising:
detecting, by the one of the mobile device and the radio controller device, a geofence trigger comprising determining, as a function of a second determined current location of the mobile device that the mobile device has crossed a geofence boundary into a new active geofence;
adding or enabling, by the one of the mobile device and the radio controller device, the new active geofence, its associated priority level, and its associated talkgroup in the geofence mapping; and
determining, by the one of the mobile device and the radio controller device, if the new active geofence's associated priority level is higher than the geofence priority associated with the particular talkgroup and, if so, joining the new active geofence's associated talkgroup.

13. The method of claim 1, further comprising detecting, by the one of the mobile device and the radio controller device, a geofence trigger comprising determining, as a function of a second determined current location of the mobile device that the mobile device has crossed a geofence boundary out of a currently active geofence; and
removing or disabling, by the one of the mobile device and the radio controller device, the currently active geofence, its associated priority level, and its associated talkgroup in the geofence mapping; and
if the currently active geofence was the highest priority geofence:
identifying, for each talkgroup in the plurality of talkgroups other than the particular talkgroup, a second particular talkgroup associated with a second highest priority geofence; and
joining the mobile device, by the one of the mobile device and the radio controller device, to the second particular talkgroup.

14. The method of claim 1, further comprising:
receiving by, the one of the mobile device and the radio controller device, updated geofence priority level information over-the-air from a wireless infrastructure;
updating, by the one of the mobile device and the radio controller device, the geofence mapping using the updated geofence priority level information to create a second updated geofence mapping;
identifying, by the one of the mobile device and the radio controller device, a second subset of the plurality of different talkgroups from the plurality of different talkgroups in the second updated geofence mapping having an active status and, for each talkgroup in the second subset, a second particular talkgroup associated with a highest priority geofence; and
if the second particular talkgroup is different from the particular talkgroup, joining the mobile device, by the one of the mobile device and the radio controller device, to the second particular talkgroup instead of the particular talkgroup.

15. The method of claim 1, wherein determining, by the one of the mobile device and the radio controller device, the current location of the mobile device comprises the mobile device determining its own current location via one of a global navigation satellite system (GNSS) and a triangulation process and wherein identifying, by the one of the mobile device and the radio controller device, the plurality of active geofences having definitions that include the determined current location of the mobile device comprises determining, by the mobile device via access to locally stored geofence definitions, the plurality of active geofences having definitions that include the determined current location of the mobile device.

16. The method of claim 1, wherein determining, by the one of the mobile device and the radio controller device, the current location of the mobile device comprises the mobile device determining its own current location via one of a global navigation satellite system (GNSS) and a triangulation process;

the method further comprising the mobile device reporting its own current location to the radio controller device;

wherein identifying, by the one of the mobile device and the radio controller device, the plurality of active geofences having definitions that include the determined current location of the mobile device comprises determining, by the radio controller device via access to locally stored geofence definitions, the plurality of active geofences having definitions that include the determined current location of the mobile device.

17. The method of claim 1, wherein at least one of the plurality of active geofences is a geographic sub-region of another of the plurality of active geofences.

18. The method of claim 1, wherein each of the geofences is associated with a separate incident response scene or with separate sub-portions of a single incident response scene.

19. An electronic communications device operating in a wireless communications network for providing group scan for mobile devices located in overlapping active geofences, the electronic communications device comprising:
 a memory;
 a transceiver; and
 a processor configured to:
 determining a current location of a mobile device;
 identifying a plurality of active geofences having definitions that include the determined current location of the mobile device;
 accessing a geofence mapping that assigns, for each of the identified plurality of active geofences, one of a plurality of different priority levels and one of a plurality of different talkgroups;
 monitoring each of the plurality of different talkgroups for active calls as a function of the different priority levels;
 identifying a subset of the plurality of different talkgroups from the plurality of different talkgroups in the geofence mapping having an active call and, for each talkgroup in the subset, a particular talkgroup associated with a highest priority geofence;
 joining the mobile device to the particular talkgroup; and
 adding or enabling, by one of a mobile device and radio controller device, a new active geofence, its associated priority level, and its associated talkgroup in the geofence mapping when the mobile device has crossed a geofence boundary into the new active geofence.

20. A system for providing group scan for mobile devices located in overlapping active geofences, the system comprising:
 a mobile device wirelessly coupled to a wireless infrastructure; and
 a radio controller in the wireless infrastructure;
 wherein one of the mobile device and the radio controller is configured to:
 determining a current location of the mobile device;
 identifying a plurality of active geofences having definitions that include the determined current location of the mobile device;
 accessing a geofence mapping that assigns, for each of the identified plurality of active geofences, one of a plurality of different priority levels and one of a plurality of different talkgroups;
 monitoring each of the plurality of different talkgroups for active calls as a function of the different priority levels;
 identifying a subset of the plurality of different talkgroups from the plurality of different talkgroups in the geofence mapping having an active call and, for each talkgroup in the subset, a particular talkgroup associated with a highest priority geofence;
 joining the mobile device to the particular talkgroup; and
 adding or enabling, by the one of the mobile device and the radio controller, a new active geofence, its associated priority level, and its associated talkgroup In the geofence mapping when the mobile device has crossed a geofence boundary into the new active geofence.

\* \* \* \* \*